Jan. 4, 1927.
J. M. SCHUTZ
DRAFT INDUCING MEANS
Filed April 9, 1925
1,612,838
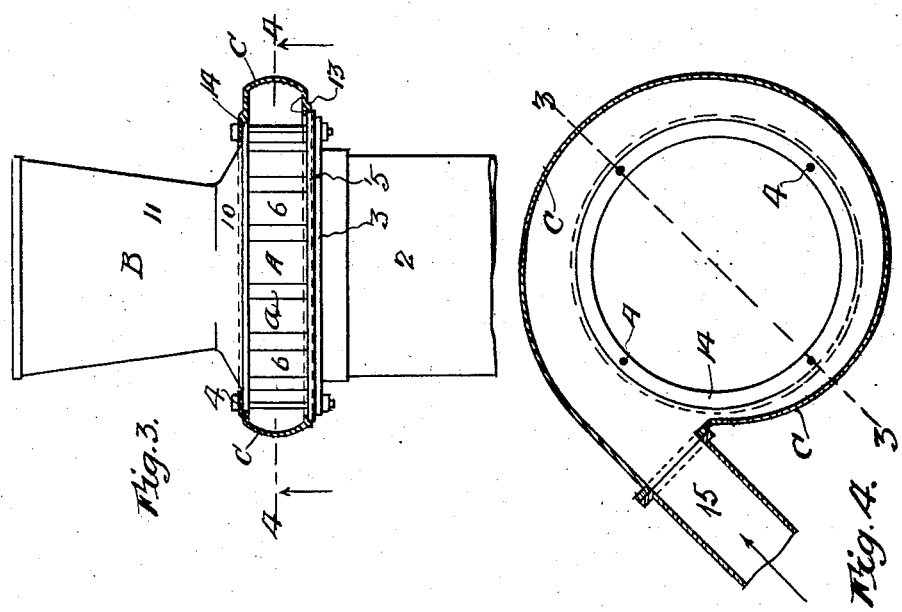
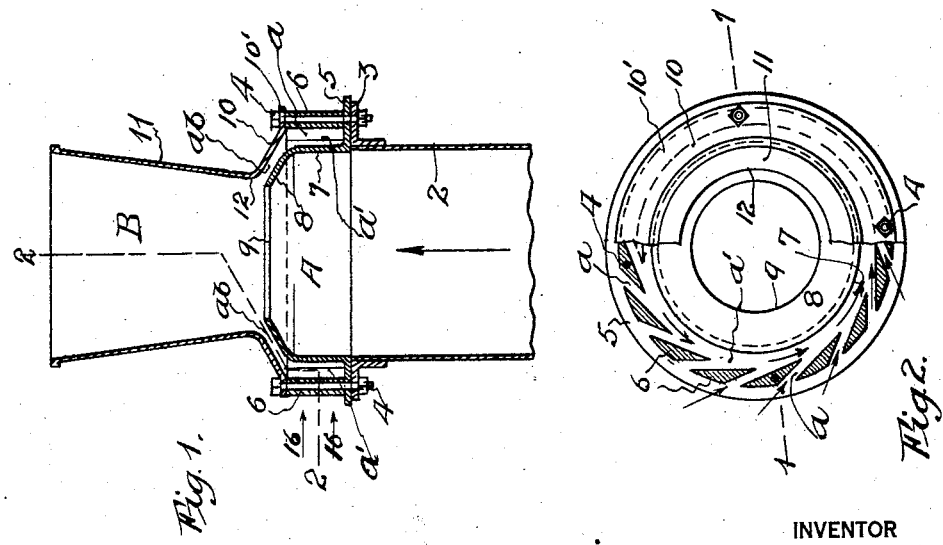
INVENTOR
Joseph M Schutz
BY
ATTORNEY Patented Jan. 4, 1927.

1,612,838

UNITED STATES PATENT OFFICE.

JOSEPH MARTIN SCHUTZ, OF CHICAGO, ILLINOIS, ASSIGNOR, BY MESNE ASSIGNMENTS, TO CENTRIFIX CORPORATION, OF CLEVELAND, OHIO, A CORPORATION OF DELAWARE.

DRAFT-INDUCING MEANS.

Application filed April 9, 1925. Serial No. 21,840.

My invention relates to means for causing or inducing the movement of fluids, more particularly gases and air, in chimneys, stacks, vents, ducts and the like. Primarily, it is intended for use in increasing the upward velocity of gases in chimneys and ventilating stacks, but as will presently become clear, the invention is applicable in various positions, and further is not limited to use with upward moving columns, or to the movement of aeriform fluids as distinguished from liquids.

The invention will be readily understood on reference to the drawings that form part of this specification, and in which:—Fig. 1 is a longitudinal section of the device or apparatus embodying my invention; on the line 1—1 of Fig. 2;—Fig. 2 is an end view thereof partly in section on the irregular line 2—2 of Fig. 1;—Fig. 3 is a sectional view (see line 3—3 of Fig. 4), showing the device proper in side elevation, the section disclosing the pressure fluid volute that may be used therewith;—and, Fig. 4 is a transverse section of the volute only, as viewed from beneath, on the line 4—4 of Fig. 3.

While my invention is adapted for inclusion midway in any stack, vent or duct wherein it is desired to promote or expedite the movement of a fluid, I have, as a best example, illustrated the invention as applied to the delivery end of the vertical stack, vent or petticoat 2. In this case convenience dictates the use of a top flange 3 on the stack, to which my device may be attached.

The device itself is so simple that it may comprise only two members, A and B. A number of bolts (4) serve to fasten the members together and to the flange (3). In many sizes these parts, A and B may be stout metal castings. In other sizes and for other uses they may be made mainly or wholly of sheet metal.

The member A comprises the plate portion, 5, the circumferential series of tangential tuyère blades, 6, rising therefrom, the cylindrical part 7 and the truncated cone portion, 8, which latter terminates in the circular opening, 9. The tuyère blades may be substantially triangular in cross-section, as well shown in Fig. 2. They are separated by, or provide, the many tangential slots or tuyères, a. The tops of the blades, 6, receive the base flange, 10′, of the member B. Obviously, the lower ends of the tuyères or slots, a, are closed by the plate 5, and the upper ends thereof are closed by the circular flange 10′.

It will be noted that the cylindrical portion 7 is concentric with and preferably of substantially the same diameter as the stack, 2. It may be of greater or of less diameter. The tuyère ring, or ring of tuyère blades, is of greater internal diameter than the part 7, thus providing the circumferential space $a^1$. Finally, as to the member A, it is to be noted that the cone portion 8 rises above the level of the tuyère blades. It may conform to a sharp angle, but preferably conforms to an angle of substantially 30° to the horizontal.

The member B is a venturi like member, being made up of the short conical section 10 and the longer and gently tapered section 11. The portion 10 substantially parallels the cone 8 of the member 7 and is spaced therefrom to provide the conical Venturi throat entrance passage $ab$. As shown, the juncture 12 of the portions 11 and 10 is preferably of somewhat greater diameter than the opening 9.

The flange portions 10′ and 5 and certain of the blades 6 are drilled or cored to admit the fastenings or bolts 4.

Passing now to Figs. 3 and 4 it will be seen that there is there added to the device an enclosing chamber or volute C. By preference this is a light casting and its bottom contains a shouldered opening 13 to fit down over the periphery of the part 5, while the top of the volute contains a smaller shouldered opening 14 which fits the smaller member 10′. The volute is fastened by the same bolts 4 that appear in Figs. 1 and 2. The part 15 is a pressure fluid pipe or connection.

This invention may be used in many different ways, and in various connections. The following description of two such uses will serve to define all of them.

The simplest use is at the top of a smoke stack or a vent pipe that is exposed to the winds and air currents of the outside atmosphere. It will be at once noted that this device provides the stack with a top which is a true Venturi tube. The top of the tube may be of the same or greater diameter than the stack and the constriction of the tube at the throat or opening, 9, has little, if any, effect upon the natural draft in the stack 2. Next assuming a wind to be blowing against the device in the direction of the arrows, 16, it will be obvious that currents of pressure air will enter certain of the tangential tuyères, $a$, and immediately the pressure air will be caused to set up a rapid whirling motion within the circumferential space, $a^1$. The tuyère blades overlap in the same direction throughout the circumference of the tuyère ring, and little, if any, of the whirling air escapes through the tuyères at that side of the ring which is opposite the approach of the wind. Hence the whirling air within the space, $a^1$, is forced to find its escape through the conical passage $ab$. The approach of the whirling mass toward the axis is accompanied by a constriction of radius and a considerable increase in the speed of rotation about that axis and this whirling action at the throat of the Venturi tube and above the member 8, accompanied by the immediate and rapid expansion of the whirling mass in the tapering top of the member B, induces or causes a strong draft and movement in the stack 2; markedly increasing the velocity of the gases therein.

The next example to be cited has to do with the employment of the volute C, or some other pressure chamber which encloses the tuyère ring. Such a chamber being provided, it is only necessary to supply the same with pressure air, exhaust steam or the like. This being set into whirling motion and escaping in a whirling condition into the throat of the venturi-like device induces a strong and reliable draft in the stack. The advantages of this added part are apparent; in contrast to dependence upon the vigor of varying wind pressure.

It should now be evident that this centrifico-venturi device is adapted for application in many arts, including that of moving fluids as well as air and gases. In cases that demand constant action, the motion exciting fluid should be positively supplied to the centrifugal action ring; as by means of the chamber C enclosing the throat of the Venturi tube.

Having thus described my invention I claim as new and desire to secure by Letters Patent:

The herein-described draft device, comprising a Venturi tube forming member 7—8, in combination with a Venturi tube forming member 10—11, a circumferential series of inwardly directed tangential tuyères spaced from said part 7, and the parts 8 and 10, being spaced apart and thus providing a conical passage leading from the tangential tuyères to the throat of the Venturi tube formed by said members.

In testimony whereof I have hereunto set my hand at Cleveland, Ohio, the 7 day of April, 1925.

JOSEPH MARTIN SCHUTZ.